(12) United States Patent
Jee et al.

(10) Patent No.: US 12,647,597 B2
(45) Date of Patent: Jun. 2, 2026

(54) VIDEO ENCODER, VIDEO ENCODING METHOD, AND VIDEO DECODER

(71) Applicant: SAMSUNG ELECTRONICS CO., LTD., Suwon-si (KR)

(72) Inventors: Seung Hoon Jee, Suwon-si (KR); Paul Oh, Suwon-si (KR); Young Hun Sung, Suwon-si (KR); Jung Yeop Yang, Suwon-si (KR); Do Kwan Oh, Suwon-si (KR); Jun Hee Lee, Suwon-si (KR); Dong Won Jang, Suwon-si (KR); Jong Seong Choi, Suwon-si (KR); Chan Sol Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/647,601

(22) Filed: Apr. 26, 2024

(65) Prior Publication Data

US 2025/0159231 A1 May 15, 2025

(30) Foreign Application Priority Data

Nov. 9, 2023 (KR) ........................ 10-2023-0154594

(51) Int. Cl.
| | |
|---|---|
| *H04N 19/59* | (2014.01) |
| *G06T 3/02* | (2024.01) |
| *G06V 10/82* | (2022.01) |
| *H04N 19/119* | (2014.01) |
| *H04N 19/513* | (2014.01) |

(52) U.S. Cl.
CPC ............. *H04N 19/513* (2014.11); *G06T 3/02* (2024.01); *G06V 10/82* (2022.01); *H04N 19/119* (2014.11); *H04N 19/59* (2014.11)

(58) Field of Classification Search
CPC ........ H04N 19/513; G06V 10/82; G06T 3/02; B60W 60/0011
See application file for complete search history.

(56) References Cited

U.S. PATENT DOCUMENTS

| | | | |
|---|---|---|---|
| 10,291,928 B2 | 5/2019 | He | |
| 10,643,305 B2 | 5/2020 | Yu et al. | |

(Continued)

FOREIGN PATENT DOCUMENTS

| | | |
|---|---|---|
| CN | 110383841 A | 10/2019 |
| KR | 10-2021-0123216 A | 10/2021 |

(Continued)

OTHER PUBLICATIONS

Improvement of Decoded side intra mode DIMD derivation; Zhao—2021; (Year: 2021).*

(Continued)

*Primary Examiner* — Luis Perez-Fuentes
(74) *Attorney, Agent, or Firm* — Sughrue Mion, PLLC

(57) ABSTRACT

A video encoder is provided. The video encoder according to an example embodiment includes: a differentiable prediction (DP) module configured to output an optimal initial search position by performing full search in a predetermined area by using a pair of frames of a video as input; and a motion estimation (ME) module configured to perform motion estimation by moving a search position toward the optimal initial search position output by the DP module.

15 Claims, 15 Drawing Sheets

(56)     References Cited

U.S. PATENT DOCUMENTS

|  |  |  |  |  |
|---|---|---|---|---|
| 11,190,807 | B2 | 11/2021 | Esenlik et al. | |
| 11,523,115 | B2 | 12/2022 | Lim et al. | |
| 11,838,506 | B2 | 12/2023 | Lim et al. | |
| 12,067,661 | B2 * | 8/2024 | Saito | G06T 17/00 |
| 2022/0377358 | A1 | 11/2022 | Galpin et al. | |
| 2023/0030020 | A1 | 2/2023 | Li et al. | |
| 2024/0010232 | A1 * | 1/2024 | Karkus | B60W 50/0097 |
| 2024/0412382 | A1 * | 12/2024 | Jee | H04N 19/56 |

FOREIGN PATENT DOCUMENTS

|  |  |  |  |
|---|---|---|---|
| KR | 10-2023-0058133 | A | 5/2023 |
| KR | 10-2024-0173786 | A | 12/2024 |

OTHER PUBLICATIONS

Differentiable integrated motion prediction; Huang—2022; (Year: 2022).*
Differentiable gaussian process motion planning; Bardwaj—2020; (Year: 2020).*

* cited by examiner

FIG. 3

VIDEO ENCODER, VIDEO ENCODING METHOD, AND VIDEO DECODER

CROSS-REFERENCE TO RELATED APPLICATION(S)

This application claims priority from Korean Patent Application No. 10-2023-0154594, filed on Nov. 9, 2023, in the Korean Intellectual Property Office, the entire disclosure of which is incorporated herein by reference for all purposes.

BACKGROUND

1. Field

The following description relates to a video encoder, a video encoding method using the video encoder, and a video decoder.

2. Description of the Related Art

With the development of information and communication technology, videos are captured, stored, and shared in active and diverse ways. Particularly, an increasing number of videos are captured and stored using mobile devices and portable devices, and image signal processing (ISP) is required for processing the captured videos to address physical deterioration, or codec technology is required for efficient storage and transmission of the videos. In the ISP or codec technology, video processing is performed by estimating a correlation between frames in a sequence, which is an image stream, to improve video quality, or the correlation is compressed so that a video with a low volume may be stored and transmitted. The correlation between the frames is based on motion estimation (ME) between images in units, e.g., patch or block, of a video to be processed. However, if a maximum search range is set within the system-on-chip (SoC) as in a mobile device, or if a search range is set for software optimization, motion beyond a certain level, which increases as video resolution increases, may not be found.

SUMMARY

According to an aspect of an example embodiment, provided is a video encoder including: a differentiable prediction (DP) module configured to output an optimal initial search position by performing full search in a predetermined area by using a pair of frames of a video as input; and a motion estimation (ME) module configured to perform motion estimation by moving a search position toward the optimal initial search position output by the DP module.

The DP module may be configured to generate a predicted image for each of a plurality of initial search positions in the predetermined area, and output an initial search position, at which a residual between the generated predicted image and a first frame of the pair of frames is minimized, as the optimal initial search position.

The DP module may include: an affine transformation module configured to perform affine transformation on a second frame of the pair of frames for each of the plurality of initial search positions; and a motion estimation motion compensation (MEMC) module configured to: perform motion estimation on the second frame, which is affine transformed for each of the plurality of initial search positions, to output motion in a kernel form; and perform motion compensation based on the motion in the kernel form, to generate the predicted image.

The MEMC module may be configured to: for each block of a plurality of blocks of the affine-transformed second frame, perform unfolding of a block to divide the block into a plurality of patches, and calculate a sum of absolute differences (SAD) between the plurality of patches of the block and a corresponding block of the first frame; and generate the motion in the kernel form based on calculated SADs of the plurality of blocks, by using softmax.

The DP module may be configured to perform parallel processing on a plurality of pairs of frames of the video by using one or more processors.

The one or more processors may include a graphic processing unit (GPU).

The video encoder may further include a scaler configured to scale the pair of frames of the video to a size to be processed by the DP module.

At least one of a number and a size of the predetermined area may be preset based on at least one of computing power, target processing speed, of accuracy of the motion estimation.

According to an aspect of an example embodiment, provided is a video encoder including: an initial search position optimization (ISPO) module including a neural network that is trained to output an optimal initial search position by using a pair of frames of a video as input; and a motion estimation (ME) module configured to perform motion estimation by moving a search position toward the optimal initial search position output by the ISPO module, wherein the neural network is trained to output the optimal initial search position by using a ground truth (GT) initial search position generated by performing full search in a predetermined area by an differentiable prediction (DP) module.

The neural network may include a convolutional neural network (CNN).

The neural network may be trained to output the optimal initial search position as an affine matrix value.

The neural network may be trained by using the GT initial search position, which is output by generating a predicted image for a plurality of initial search positions in the predetermined area, and determining an initial search position, at which a residual between the predicted image and a first frame of the pair of frames is minimized.

According to an aspect of an example embodiment, provided is a video encoding method including: outputting, by a differentiable prediction (DP) module, an optimal initial search position by performing full search in a predetermined area by using a pair of frames of a video as input; and performing, by a motion estimation (ME) module, motion estimation by moving a search position toward the optimal initial search position output by the DP module.

The outputting of the optimal initial search position may include: generating a predicted image for a plurality of initial search positions in the predetermined area; and outputting an initial search position, at which a residual between the generated predicted image and a first frame of the pair of frames is minimized, as the optimal initial search position.

The generating of the predicted image may include: performing affine transformation on a second frame of the pair of frames for each of the plurality of initial search positions; performing motion estimation on the second frame, which is affine transformed for each of the plurality of initial search positions, to output motion in a kernel form;

and performing motion compensation based on the motion in the kernel form to generate the predicted image.

The outputting of the motion in the kernel form may include: for each block of a plurality of blocks of the affine-transformed second frame, performing unfolding of a block to divide the block into a plurality of patches, and calculating a sum of absolute differences (SAD) between the plurality of patches of the block and a corresponding block of the first frame; and generating the motion in the kernel form based on calculated SADs of the plurality of blocks, by using softmax.

The outputting of the optimal initial search position may include performing parallel processing on a plurality of pairs of frames of the video by using one or more processors.

The video encoding method may further include scaling the pair of frames of the video to a size to be processed by the DP module.

According to an aspect of an example embodiment, provided is a video decoder including: a motion compensation (MC) module configured to perform motion compensation based on a motion vector, the motion vector extracted by motion estimation of a pair of frames of a video based on an optimal initial search position which is obtained by performing full search for the pair of frames of the video by a video encoder; and a decoding module configured to decode the video based on a result of the motion compensation.

According to an aspect of an example embodiment, provided is an electronic device including: a position estimation device configured to output an optimal initial search position by using a pair of frames of a video as input; an image processing device configured to perform motion estimation based on the output optimal initial search position, and configured to perform image processing based on a result of the motion estimation; and one or more processors configured to control the image processing device and process a request thereof, wherein the position estimation device includes a differentiable prediction (DP) module configured to output the optimal initial search position by performing full search in a predetermined area, or an initial search position optimization (ISPO) module including a neural network which is trained to output the optimal initial search position by using a ground truth (GT) initial search position generated by performing full search in the predetermined area by the DP module.

BRIEF DESCRIPTION OF THE DRAWINGS

Example embodiments will be more clearly understood from the following detailed description taken in conjunction with the accompanying drawings.

FIG. 3 is a diagram explaining parallel processing of a DP module according to an example embodiment.

DETAILED DESCRIPTION

Figure 1:
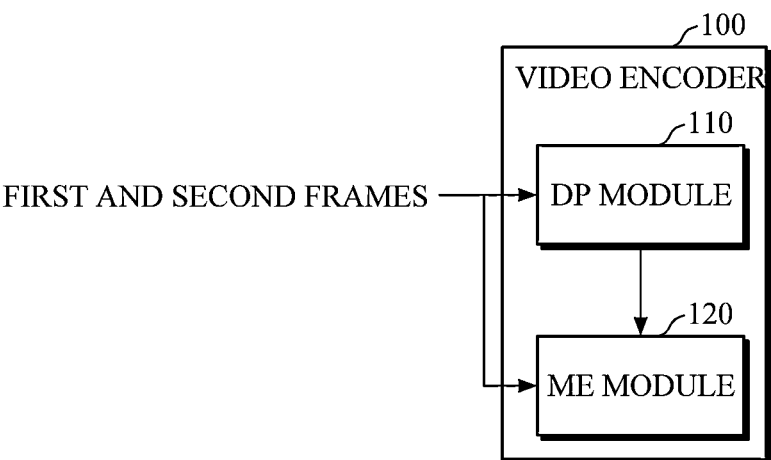
FIG. 1 is a block diagram illustrating a video encoder according to an example embodiment of the disclosure.

Details of example embodiments are included in the following detailed description and drawings. Advantages and features of the disclosure, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as "unit" or "module," etc., should be understood as a unit that performs at least one function or operation and that may be embodied as hardware, software, or a combination thereof.

Figure 2A:
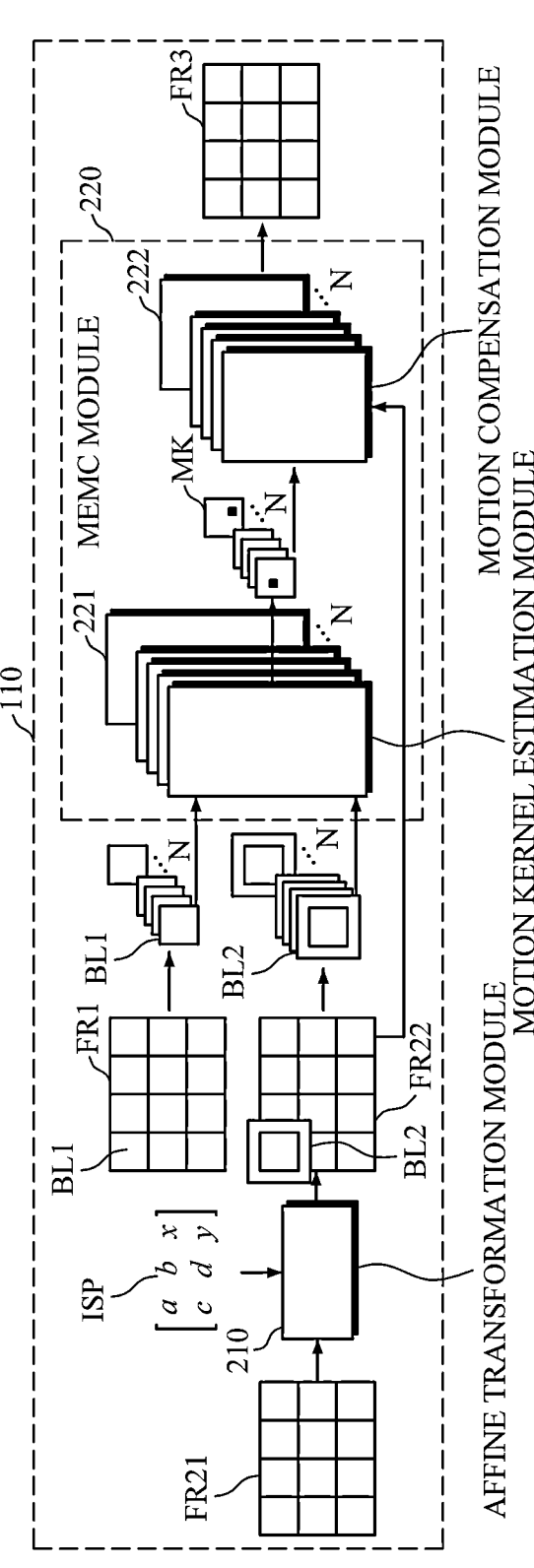
FIGS. 2A to 2C are diagrams explaining an example of a differentiable prediction (DP) module of FIG. 1.
Figure 2B:
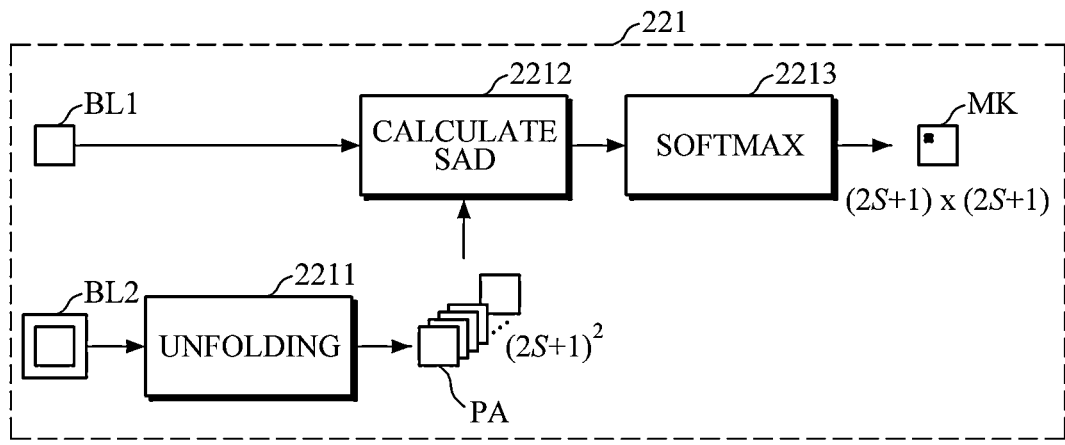
Figure 2C:
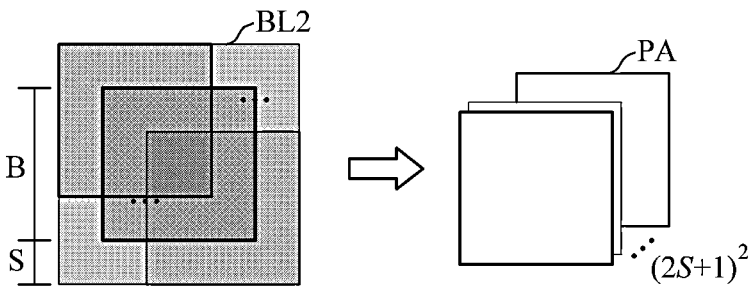
Figure 3:
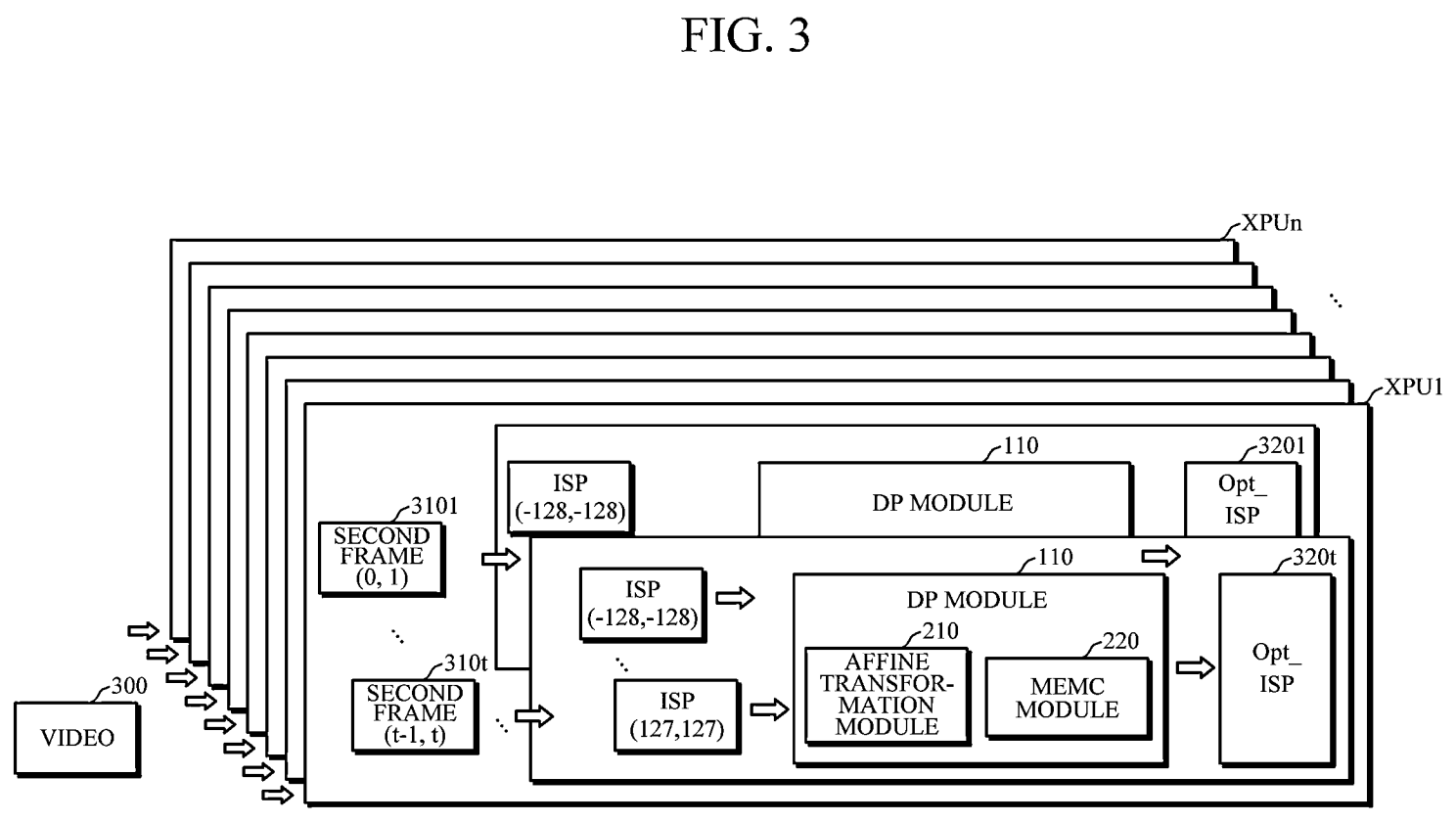

FIG. 1 is a block diagram illustrating a video encoder according to an example embodiment of the disclosure. FIGS. 2A to 2C are diagrams explaining an example of a differentiable prediction (DP) module of FIG. 1. FIG. 3 is a diagram explaining parallel processing of a DP module.

Referring to FIG. 1, a video encoder 100 includes a differentiable prediction (DP) module 110 and a motion estimation (ME) module 120. The video encoder 100 may encode a video by using results processed by the DP module 110 and the ME module 120.

The DP module 110 may be implemented with a neural network mimicking the standard codec. The DP module 110 may include a differentiable module so that backpropagation flows. The DP module 110 may perform full search for initial search positions in a predetermined area by using a pair of frames (e.g., a first frame and a second frame) of a video as input, to output an optimal initial search position for motion estimation. The first frame may be a frame at a current time t, and the second frame may be a frame at a previous time (t−1). In this case, the predetermined area may be, for example, an entire input frame area, or a size and a number of areas may be adjusted as needed based on at least one of computing power, target processing speed, and accuracy of motion estimation. For example, the area may be scaled down for fast processing, and one or more areas among all frame areas may be sampled to be used as areas for full search. In addition, the size of an input video itself may be scaled down for fast processing, and the entire downscaled video may be set as an area for the full search.

FIG. 2A is a block diagram illustrating an example of the DP module 110.

Referring to FIG. 2A, the DP module 110 may include an affine transformation module 210 which is implemented as a differentiable module, and a motion estimation motion compensation (MEMC) module 220.

The affine transformation module 210 receives a second frame FR21 of a video and initial search positions thereof. The input initial search positions may be respective pixel positions in an area set for full search of the second frame FR21. The affine transformation module 210 may perform affine transformation on the second frame FR21 for input initial search positions ISP. By the affine transformation module 210, the second frame FR21 may be converted into an image similar to the first frame FR1, so that motion estimation for each block may be performed within a search range.

The MEMC module 220 may include a motion kernel estimation module 221 and a motion compensation module 222. The motion kernel estimation model 221 may divide each of the first frame FR1 and the affine-transformed second frame FR22 into a plural number N of blocks BL1 and a plural number N of blocks BL2 of a predetermined size, and may perform motion estimation for each block. In the first frame FR1, each block may be divided into a fixed size of an image, and in the second frame FR22, each block may be divided into a size that covers the search range to overlap with surrounding blocks. The motion kernel estimation module 221 may output motion in kernel form, which is to be used for a later differentiable convolution operation during prediction using motion compensation.

FIG. 2B is a diagram illustrating an example of the motion kernel estimation module 221 which is implemented as a differentiable module, and FIG. 2C is a diagram illustrating an example of an unfolding process 2211 of the motion kernel estimation module 221.

Referring to FIGS. 2B and 2C, each block BL2 of the second frame FR22, which is affine transformed, may be divided into $(2S+1)^2$ number of patches PA by the unfolding process 2211. Here, S denotes a search range. The size of the patch PA is a block size B and is equal to a block size of the first frame FR1. For example, if the block size B is 4, and the search range S is 3, the block may be divided into 49 patches PA having a size of 4 by the unfolding process 2211.

Then, a sum of absolute differences (SAD) between the respective patches PA of a specific block BL2 of the affine-transformed second frame FR2 and the block BL1 of the first frame FR1, which corresponds to the specific block BL2, is calculated (2212), and motion kernel (MK) may be generated by selecting a patch position with a smallest SAD by using a softmax function (2213).

Referring back to FIG. 2A, the motion compensation module 222 may perform motion compensation and/or convolution by using the motion kernel MK output by the motion kernel estimation module 221, and may generate a predicted image FR3 for the first frame FR1 by merging the motion-compensated block at its original position.

The DP module 110 may obtain a residual, which is a difference (FR1-FR3) between the first frame FR1 and the predicted image FR3 generated at each of the initial search positions, and may output an initial search position, at which the residual is minimized, as an optimal initial search position.

Referring to FIG. 3, the DP module 110 may perform parallel processing by segmenting all frame pairs of an input video 300 using a plurality of processors XPU1, . . . , and XPUn. In this case, the processors XPU1, . . . , and XPUn may include a graphic processing unit (GPU), a central processing unit (CPU), a neural processing unit (NPU), a tensor processing unit (TPU), and the like. In one processor XPU1, a plurality of frame pairs 3011, . . . , and 301t may be processed in parallel or the plurality of frame pairs 3011, . . . , and 301t may be processed sequentially one by one. For example, the processor XPU1 may output an optimal initial search position Opt_ISP 320t by executing the affine transformation module 210 and the MEMC module 220 for initial search positions ISP (-128,-128) to ISP (127, 127) of the frame pair 310t. In this manner, by processing the frame pairs in parallel by using one or more processors, optimal initial search positions Opt_ISP 3201, . . . , and 320t may be rapidly and accurately estimated by a full search method.

Referring back to FIG. 1, the ME module 120 may receive the first frame and the second frame and the optimal initial search position output by the DP module 110, and may perform motion estimation based on the optimal initial search position. In this manner, video encoding may be rapidly and accurately performed on input videos of various sizes. The ME module 120 may perform motion estimation in units of blocks between the first and second frames. In this case, the ME module 120 may perform motion estimation by moving the center of a search range toward the optimal initial search position.

Figure 4:
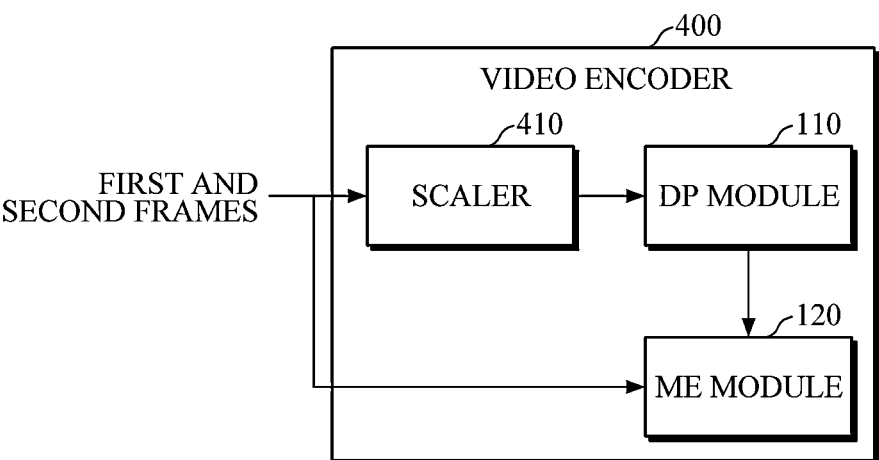
FIG. 4 is a block diagram illustrating a video encoder according to an example embodiment of the disclosure.

FIG. 4 is a block diagram illustrating a video encoder according to an example embodiment of the disclosure.

Referring to FIG. 4, a video encoder 400 includes the DP module 110, the ME module 120, and a scaler 410.

The scaler 410 may scale a first frame and a second frame of an input video to a size to be processed by the DP module 110, and then may input the scaled frames to the DP module 110. For example, as a video captured by a camera may have various resolutions of full high definition (FHD), 4K, 8K, etc., a video may be scaled down to a small size (e.g. 448×256), so that the DP module 110 may rapidly and accurately estimate an initial search position with a relatively small amount of calculation. However, the size of an input video is not limited thereto, and the scaler 510 may scale up or down the input video depending on the size of the video, or may input a video at its original size to the DP module 110 without scaling.

If a video scaled up or down by the scaler 410 is input, the DP module 110 may convert, as needed, an optimal initial search position into a size to match the original size of the video and may provide the converted optimal initial position to the ME module 120.

The ME module 120 may perform motion estimation by moving a search position based on the initial search position. For example, the ME module 120 may perform motion estimation after moving the center of a search range toward the initial search position. In this manner, operation may be performed effectively in response to input of videos of various sizes.

Figure 5:
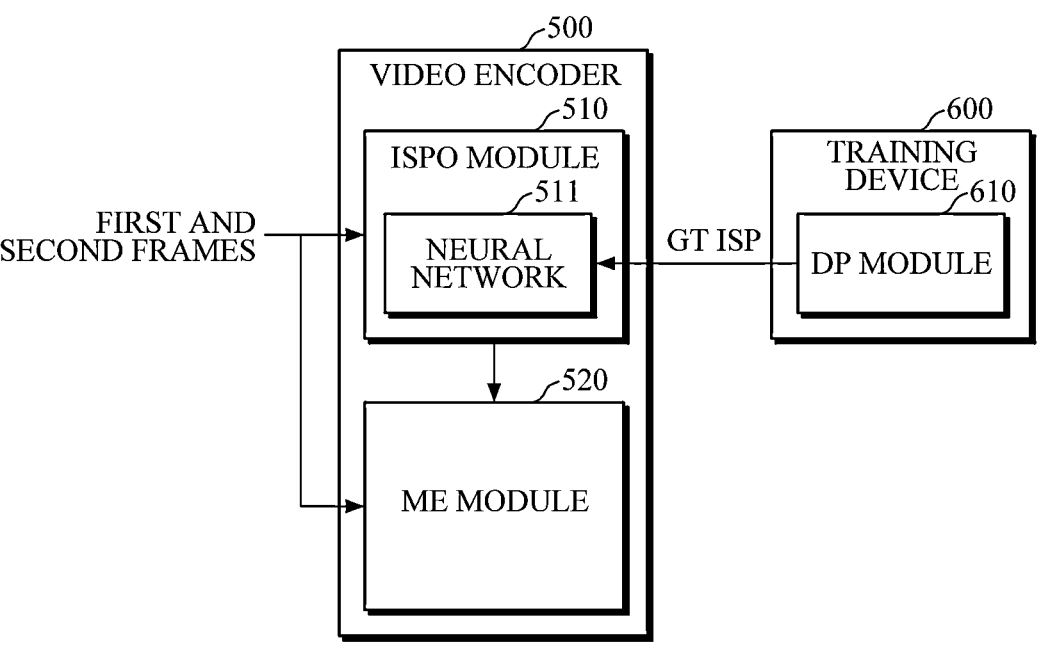
FIG. 5 is a block diagram illustrating a video encoder according to an example embodiment of the disclosure.
Figure 6:
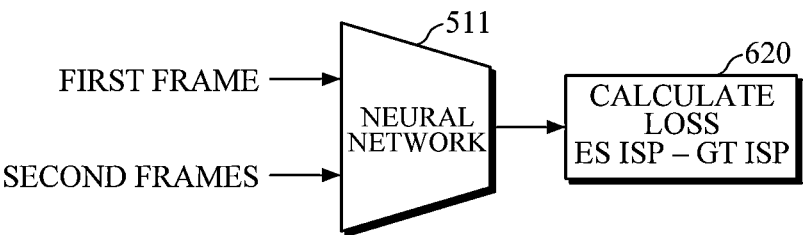
FIG. 6 is a diagram explaining a neural network of an initial search position optimization (ISPO) module of FIG. 6.

FIG. 5 is a block diagram illustrating a video encoder according to an example embodiment of the disclosure. FIG. 6 is a diagram explaining a neural network of an initial search position optimization (ISPO) module of FIG. 6.

Referring to FIG. 5, a video encoder 500 includes an initial search position optimization (ISPO) module 510 and an ME module 520. The video encoder 500 may encode a video by using results processed by the ISPO module 510 and the ME module 520.

The ISPO module 510 may include a neural network 511 which is trained to output an optimal initial search position for motion estimation by using a frame pair of a video as input, and may output an optimal initial search position by inputting the input frame pair to the neural network. In an embodiment, the neural network is trained to output the optimal initial search position as an affine matrix value.

The neural network 511 may output information about the optimal initial search position by using a first frame and a second frame as input. The neural network 511 may be, for example, a convolutional neural network (CNN), but is not limited thereto. The neural network 511 may be pre-trained by an external training device 600.

The training device 600 may include a DP module 610 and one or more processors (e.g., GPU). As described above, the DP module 610 may include an affine transformation module and an MEMC module. As illustrated above in FIG. 3, the DP module 610 may be executed by one or more processors to perform parallel processing (or sequential processing) on the input frame pairs of a video by a full search method to output an optimal initial search position Opt_ISP. The optimal initial search position Opt_ISP, output by the DP module 610, may be generated as a ground truth (GT) initial search position for training a neural network of the ISPO module 510.

The training device 600 may train the neural network 511 by supervised learning using the generated GT initial search position. Referring to FIG. 6, the training device 600 may calculate loss of the loss function between the GT initial search position GT ISP, generated by the DP module 610, and the initial search position ES ISP output by the neural network 511, and may train the neural network 511 such that the loss is minimized. However, the neural network is not limited thereto, and may be trained by unsupervised learning and a back-propagation method using the DP module 610 which is implemented as a differentiable module. The loss function includes peak signal-to-noise ratio (PSNR), mean squared error (MSE), cross-entropy loss, binary cross-entropy loss, log likelihood loss, frequency domain loss, etc., but is not limited thereto.

The ME module 520 may perform motion estimation by moving the center of a search range toward the optimal initial search position output by the ISPO module 510.

The video encoder 500 may be made lightweight by using the neural network 511 trained by the training device 600. Accordingly, the video encoder 500 may be mounted in an electronic device with relatively low computing power compared to the training device 600, and thus may rapidly perform video encoding. However, the video encoder 500 is not limited thereto, and may be included in the training device 600.

Figure 7:
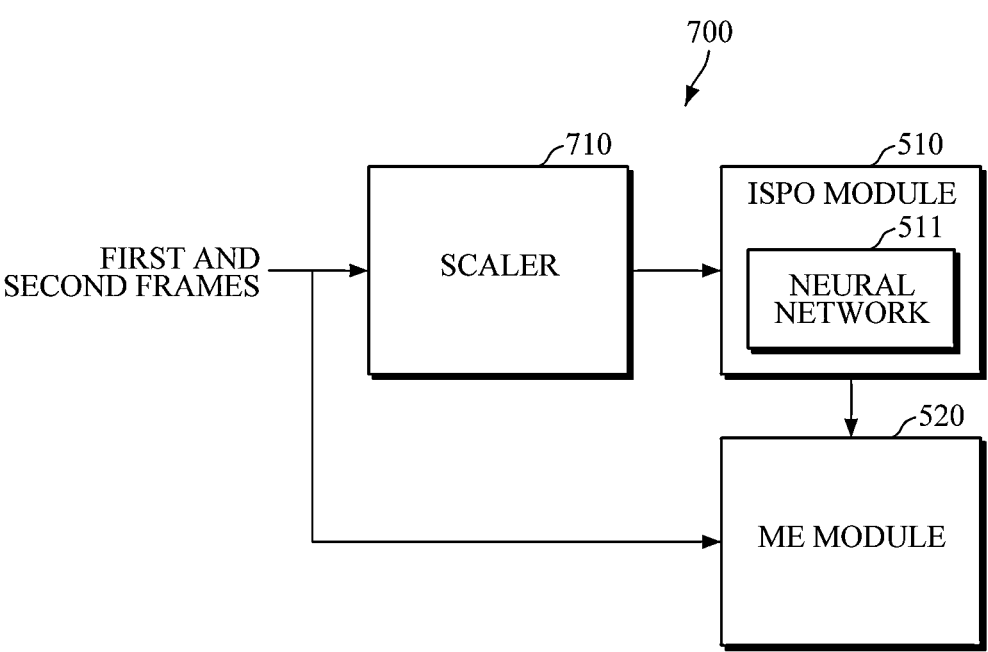
FIG. 7 is a block diagram illustrating a video encoder according to an example embodiment of the disclosure.

FIG. 7 is a block diagram illustrating a video encoder according to an example embodiment of the disclosure.

Referring to FIG. 7, a video encoder 700 includes the ISPO module 510, the ME module 520, and a scaler 710.

The scaler 710 may scale a first frame and a second frame of an input video to a size to be processed by the ISPO module 510, and may input the scaled frames to the ISPO module 510. By considering a size of the input video, a desired processing speed, a desired accuracy of encoding, etc., the scaler 510 may scale up or down the frames or may not perform scaling.

If the video is scaled up or down by the scaler 710, the ISPO module 510 may convert, as needed, an output optimal initial search position into a size to match the original size of the video and may provide the converted optimal initial position to the ME module 520.

The ME module 520 may perform motion estimation by moving the center of a search range based on the initial search position.

Figure 8:
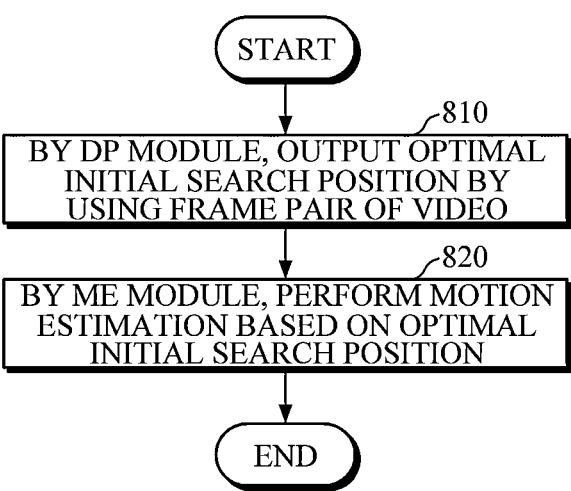
FIG. 8 is a flowchart illustrating a video encoding method according to an example embodiment of the disclosure.
Figure 9:
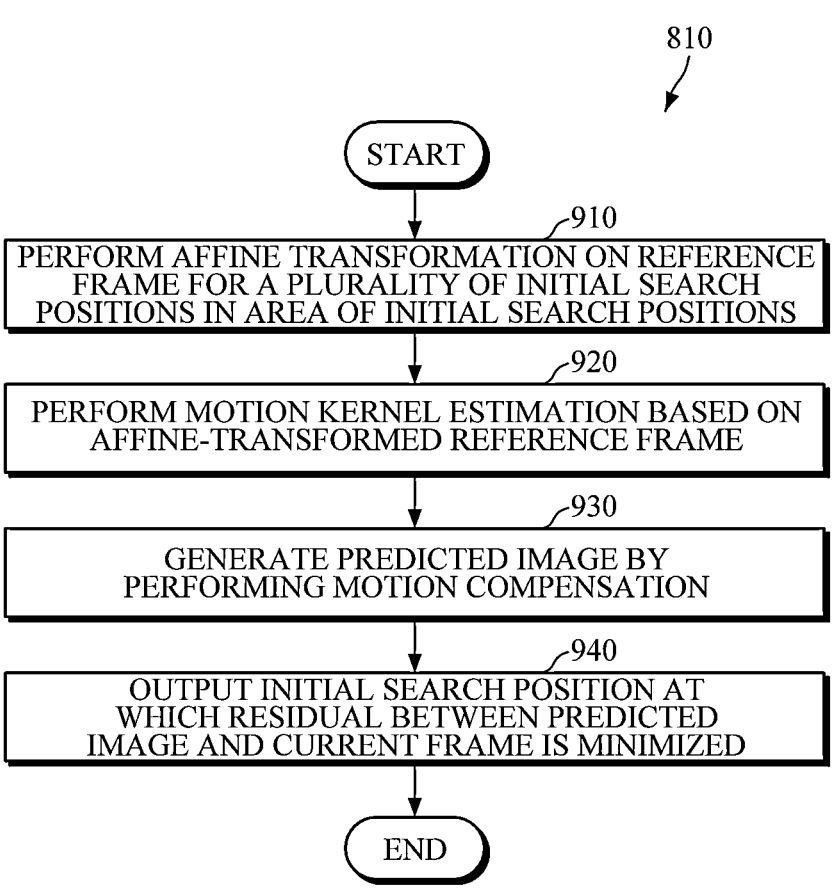
FIGS. 9 and 10 are flowcharts illustrating a method of outputting an optimal initial search position according to an example embodiment of the disclosure.
Figure 10:
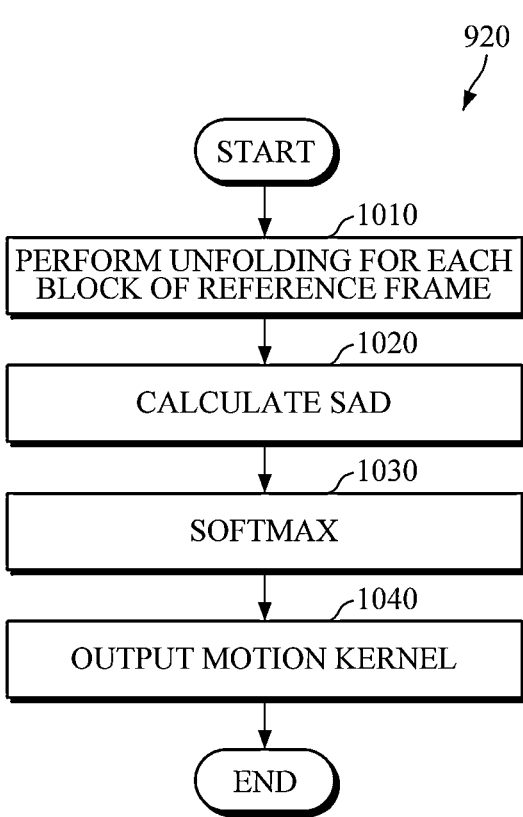

FIG. 8 is a flowchart illustrating a video encoding method according to an example embodiment of the disclosure. FIGS. 9 and 10 are flowcharts illustrating a method of outputting an optimal initial search position according to an example embodiment of the disclosure. FIGS. 8 to 10 are examples of a video encoding method performed by the video encoder 100 of FIG. 1 or the video encoder 400 of FIG. 4, and thus will be briefly described below.

First, the DP module may output an optimal initial search position by using a frame pair of a video in 810. The DP module may be executed by one or more processors (e.g., GPU) to perform full search for initial search positions in a search area set for the full search, to output an optimal initial search position for motion estimation. The size and number of areas for full search may be set in consideration of computing power, target processing speed, accuracy of motion estimation, etc., and in an embodiment, the size of an input video itself may be scaled down for fast processing.

Referring to FIG. 9, in an example of operation 810 of outputting the optimal initial search position, affine transformation may be performed on a reference frame, among frame pairs of a video, for a plurality of initial search positions in a predetermined area in 910, and motion kernel estimation is performed based on the affine-transformed reference frame in 920. Referring to FIG. 10, the motion kernel estimation in 920 may include: performing unfolding for each block of the affine-transformed reference frame to divide each block of the reference frame into a plurality of patches in 1010; calculating a sum of absolute differences (SAD) between respective patches of a specific block of the affine-transformed reference frame and a block BL1 of the first frame FR1 which corresponds to the specific block in 1020; and outputting motion kernel (MK) in 1040 by selecting a patch position with a smallest SAD by using a softmax function in 1030.

Referring back to FIG. 9, motion compensation may be performed by using the motion kernel to generate a predicted image for a current frame in 930, and an initial search position, at which a residual between the predicted image and the current frame among the frame pairs of the video is minimized, may be output as an optimal initial search position in 940. Motion compensation and/or convolution may be performed by using the motion kernel output in 920, and the predicted image for the current frame may be generated by merging the motion-compensated block at its original position. A residual between the current frame and the predicted image generated at each of all the initial search positions may be obtained, and an initial search position, at which the residual is minimized, may be output as an optimal initial search position.

Referring back to FIG. 8, the ME module may perform motion estimation in 820 for the frame pairs based on the optimal initial search position output in 810. The ME module may perform motion estimation for each block of the frame pairs by moving the center of a search range toward the optimal initial search position.

Figure 11:
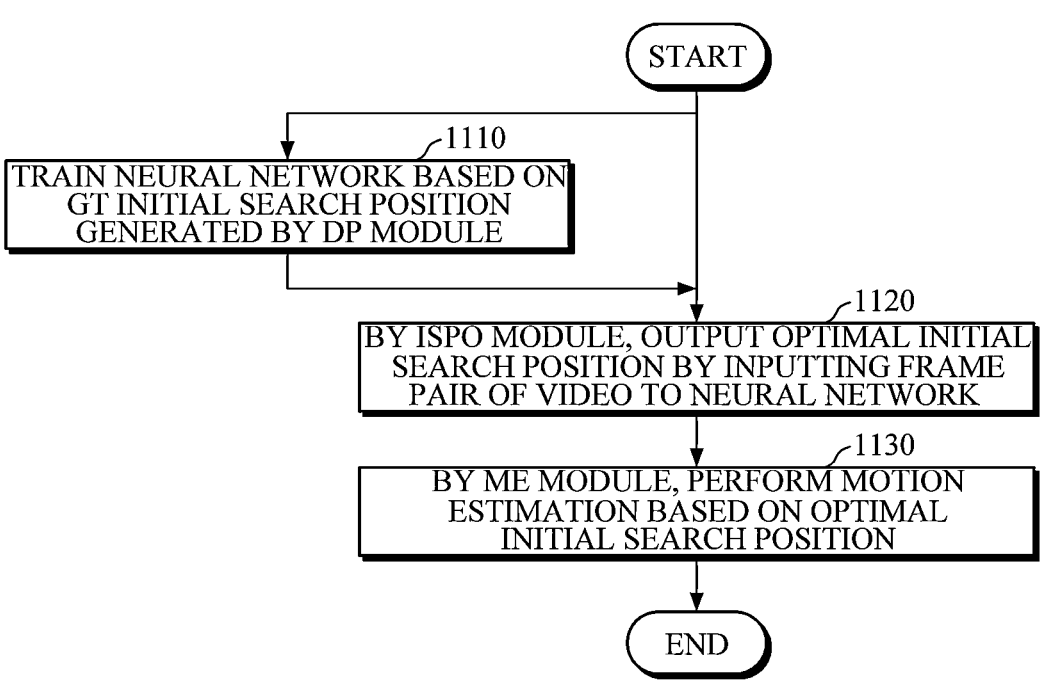
FIG. 11 is a flowchart illustrating a video encoding method according to an example embodiment of the disclosure.

FIG. 11 is a flowchart illustrating a video encoding method according to an example embodiment of the disclosure. FIG. 11 is an example of a video encoding method performed by the video encoder 500 of FIG. 5 or the video encoder 700 of FIG. 7, and thus will be briefly described below.

A neural network of the ISPO module may be trained based on a GT initial search position generated by an external DP module in 1110. The neural network may be a convolutional neural network (CNN). The DP module may be executed by one or more processors to perform processing (e.g., parallel or sequential) on the frame pairs of a video by a full search method to output an optimal initial search position. The optimal initial search position output by the DP module may be generated as a ground truth (GT) initial search position for training the neural network of the ISPO module. The neural network may be trained by supervised learning using the generated GT initial search position.

Then, the ISPO module may output an optimal initial search position in 1120 by inputting the frame pairs of the video to the neural network trained by the DP module. In this case, the size of the frame pairs of the video may be scaled as needed.

Subsequently, the ME module may perform motion estimation in 1130 by moving the center of a search range toward the optimal initial search position output by the ISPO module.

Figure 12:
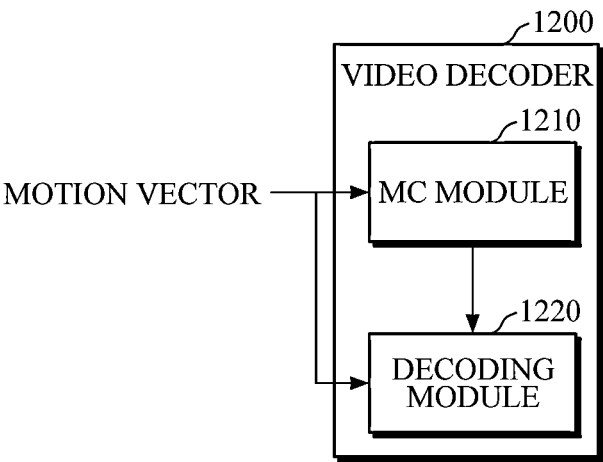
FIG. 12 is a block diagram of a video decoder according to an example embodiment of the disclosure.

FIG. 12 is a block diagram of a video decoder according to an example embodiment of the disclosure.

Referring to FIG. 12, a video decoder 1200 includes a motion compensation (MC) module 1210 and a decoding module 1220.

The MC module 1210 may perform motion compensation based on a motion vector extracted by the ME module. As described above, the DP module or the ISPO module of the video encoder performs full search for the frame pair of a video to obtain an optimal initial search position, and the ME module of the video encoder performs motion estimation based on the optimal initial search position, to obtain the motion vector.

The decoding module 1220 may decode the video based on a result of the motion compensation performed by the MC module 1210. The decoding module 1220 may perform various video decoding operations, such as decoding the compressed frames by using motion compensation, and reconstructing the frames into a format that is suitable for display on a screen depending on the video compression codec, and the like.

Figure 13:
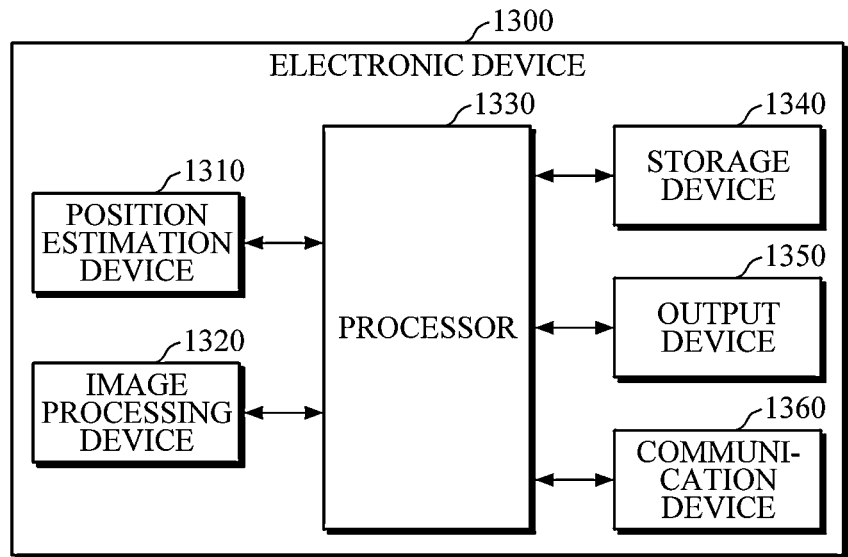
FIG. 13 is a block diagram illustrating an electronic device according to an example embodiment of the disclosure.

FIG. 13 is a block diagram illustrating an electronic device according to an example embodiment of the disclosure.

An electronic device 1300 according to an example embodiment includes one or more of various examples of the video encoder described above. The electronic device 1300 may include a device, such as an edge device which requires application for converting a low-resolution and low frame rate video into a high-resolution and high frame rate video in an environment with limited computing resources, various image transmission/reception devices, such as TVs, monitors, Internet of Things (IoT) devices, radar devices, smartphones, wearable devices, tablet computers, netbooks, laptops, desktop computers, head mounted displays (HMDs), autonomous and smart vehicles, Virtual Reality (VR) devices, Augmented Reality (AR) device, extended Reality (XR) devices, vehicles, mobile robots, etc., as well as cloud computing devices, and the like.

Referring to FIG. 13, the electronic device 1300 may include a position estimation device 1310, an image processing device 1320, a processor 1330, a storage device 1340, an output device 1350, and a communication device 1360. The position estimation device 1310 may be included in the image processing device 1320.

The position estimation device 1310 may output an optimal initial search position for motion estimation by using video frames as input. The position estimation device 1310 may include the DP module as described above, and may output an initial search position by using the DP module. Alternatively, the position estimation device 1310 may include the ISPO module including a neural network trained by the DP module, as described above. In this case, the DP module may be included in another device mounted inside or outside the electronic device 1300.

The image processing device 1320 may include a video codec device for performing video encoding and/or video decoding. The video codec device may include the aforementioned video encoder and/or video decoder. In addition, the image processing device 1320 may include a device for addressing physical deterioration, such as stabilizer or noise reduction (NR), high dynamic range (HDR), de-blur, Framerate up-conversion (FRUC), and the like.

The processor 1330 may include a main processor, e.g., a central processing unit (CPU) or an application processor (AP), etc., an intellectual property (IP) core, and an auxiliary processor, e.g., a graphics processing unit (GPU), an image signal processor (ISP), a sensor hub processor, or a communication processor (CP), which is operable independently from, or in conjunction with, the main processor, and the like. The processor 1330 may control components of the electronic device 1300 and process requests thereof. For example, one or more GPUs may support parallel processing in response to a request from the position estimation device 1301.

The storage device 1340 may store data (e.g., images (still images or moving images captured by an image capturing device), data processed by the processor 1330, a neural network used by the position estimation device 1310 and the image processing device 1320, etc.) which are required for operating the components of the electronic device 1300, and instructions for executing functions. The storage device 1340 may include a computer-readable storage medium, e.g., random access memories (RAM), dynamic random access memories (DRAM), static random access memories (SRAM), magnetic hard disk, optical disk, flash memory, electrically programmable read only memories (EPROM), or other types of computer-readable storage media known in this art.

The output device 1350 may visually and/or non-visually output the images captured by the image capturing device, and the data generated or processed by the image processing device 1320 and the processor 1330. The output device 1350 may include a sound output device, a display device (e.g., display), an audio module, and/or a haptic module.

The communication device 1360 may support establishment of a direct (e.g., wired) communication channel and/or a wireless communication channel between the electronic device and other electronic device, a server, or the sensor device within a network environment, and performing of communication via the established communication channel, by using various communication techniques. The communication device 1360 may transmit the images captured by the image capturing device, and the data generated or processed by the image processing device 1320 and the processor 1330 to another electronic device. In addition, the communication device 1360 may receive images to be processed from a cloud device or another electronic device, and may store the received images in the storage device 1340 and may transmit the images to the processor 1330 so that the images may be processed by the processor 1330.

In addition, the electronic device 1300 may further include a sensor device (e.g., acceleration sensor, gyroscope, magnetic field sensor, proximity sensor, illuminance sensor, fingerprint sensor, GPS sensor, etc.) for detecting various data, an image capturing device (e.g., camera) for acquiring images, an input device (e.g., a microphone, a mouse, a keyboard, and/or a digital pen (e.g., a stylus pen, etc.), etc.) for receiving instructions and/or data, and the like.

The disclosure may be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium may be distributed over a plurality of computer systems connected to a network so that a computer-readable code is written thereto and executed therefrom in a decentralized manner. Functional programs, codes, and code segments needed for realizing the disclosure may be readily inferred by programmers of ordinary skill in the art to which the disclosure pertains.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The disclosure has been described herein with regard to preferred embodiments. However, it will be obvious to those skilled in the art that various changes and modifications may be made without changing technical conception and essential features of the disclosure. Thus, it is clear that the above-described embodiments are illustrative in all aspects and are not intended to limit the disclosure.

What is claimed is:

1. A video encoder comprising:
a differentiable prediction (DP) module configured to output an initial search position in a video by performing full search in a predetermined area of the video by using a pair of frames of the video as input to the DP module; and a motion estimation (ME) module configured to perform motion estimation by moving a search position toward the initial search position output by the DP module.

2. The video encoder of claim 1, wherein the DP module is configured to generate a predicted image for each of a plurality of initial search positions in the predetermined area, and configured to output an initial search position, at which a residual between the generated predicted image and a first frame of the pair of frames is minimized, as the initial search position.

3. The video encoder of claim 2, wherein the DP module comprises:
an affine transformation module configured to perform affine transformation on a second frame of the pair of frames for each of the plurality of initial search positions; and
a motion estimation motion compensation (MEMC) module configured to:
perform motion estimation on the second frame, which is affine transformed for each of the plurality of initial search positions, to output motion in a kernel form; and
perform motion compensation based on the motion in the kernel form, to generate the predicted image.

4. The video encoder of claim 3, wherein the MEMC module is configured to:
for each block of a plurality of blocks of the affine-transformed second frame, perform unfolding of a block to divide the block into a plurality of patches, and calculate a sum of absolute differences (SAD) between the plurality of patches of the block and a corresponding block of the first frame; and
generate the motion in the kernel form based on calculated SADs of the plurality of blocks, by using softmax.

5. The video encoder of claim 1, wherein the DP module is configured to perform parallel processing on a plurality of pairs of frames of the video by using one or more processors.

6. The video encoder of claim 5, wherein the one or more processors comprise a graphic processing unit (GPU).

7. The video encoder of claim 1, further comprising a scaler configured to scale the pair of frames of the video to a size to be processed by the DP module.

8. The video encoder of claim 1, wherein at least one of a number and a size of the predetermined area is preset based on at least one of computing power, target processing speed, or accuracy of the motion estimation.

9. A video encoding method comprising:
outputting, by a differentiable prediction (DP) module, an initial search position in a video by performing full search in a predetermined area of the video by using a pair of frames of the video as input to the DP module; and
performing, by a motion estimation (ME) module, motion estimation by moving a search position toward the initial search position output by the DP module.

10. The video encoding method of claim 9, wherein the outputting of the initial search position comprises:
generating a predicted image for a plurality of initial search positions in the predetermined area; and
outputting an initial search position, at which a residual between the generated predicted image and a first frame of the pair of frames is minimized, as the initial search position.

11. The video encoding method of claim 10, wherein the generating of the predicted image comprises:
performing affine transformation on a second frame of the pair of frames for each of the plurality of initial search positions;

performing motion estimation on the second frame, which is affine transformed for each of the plurality of initial search positions, to output motion in a kernel form; and performing motion compensation based on the motion in the kernel form to generate the predicted image.

12. The video encoding method of claim 11, wherein the outputting of the motion in the kernel form comprises:

for each block of a plurality of blocks of the affine-transformed second frame, performing unfolding of a block to divide the block into a plurality of patches, and calculating a sum of absolute differences (SAD) between the plurality of patches of the block and a corresponding block of the first frame; and generating the motion in the kernel form based on calculated SADs of the plurality of blocks, by using softmax.

13. The video encoding method of claim 9, wherein the outputting of the initial search position comprises performing parallel processing on a plurality of pairs of frames of the video by using one or more processors.

14. The video encoding method of claim 9, further comprising scaling the pair of frames of the video to a size to be processed by the DP module.

15. The video encoder of claim 1, wherein the pair of frames comprises a first frame and a second frame corresponding to a time preceding the first frame, and wherein the DP module is further configured to:

perform an affine transformation on the second frame based on initial search positions to generate an affine-transformed second frame;

divide the first frame and the affine-transformed second frame into a plurality of first blocks and a plurality of second blocks, respectively, wherein each of the plurality of second blocks has a size that overlaps with neighboring second blocks; and perform the motion estimation between the plurality of first blocks and the plurality of second blocks to output motion information.

\* \* \* \* \*